I. GRAYSON.
FISH SCALER.
APPLICATION FILED MAR. 31, 1919.
1,328,148.
Patented Jan. 13, 1920.
2 SHEETS—SHEET 2.
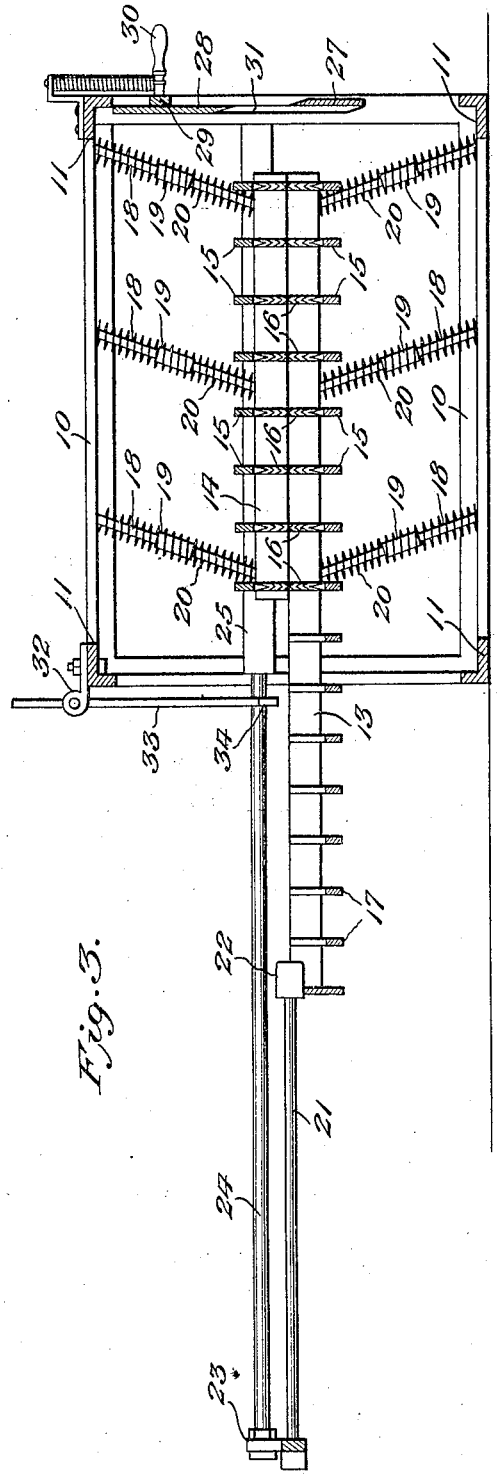
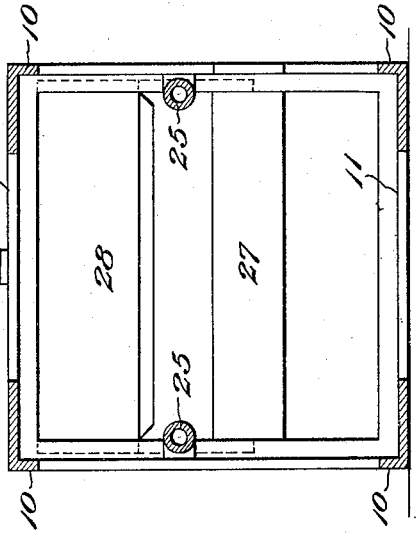
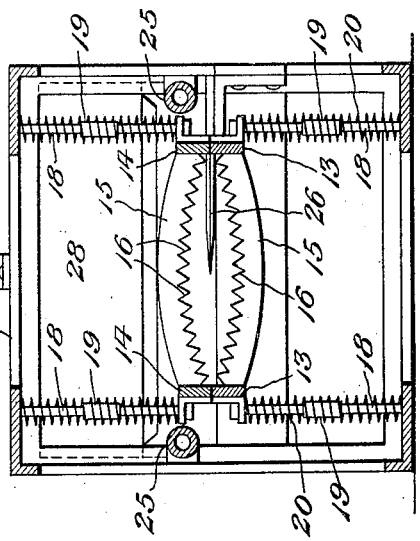
Inventor
Iona Grayson
By Victor J. Evans
Attorney

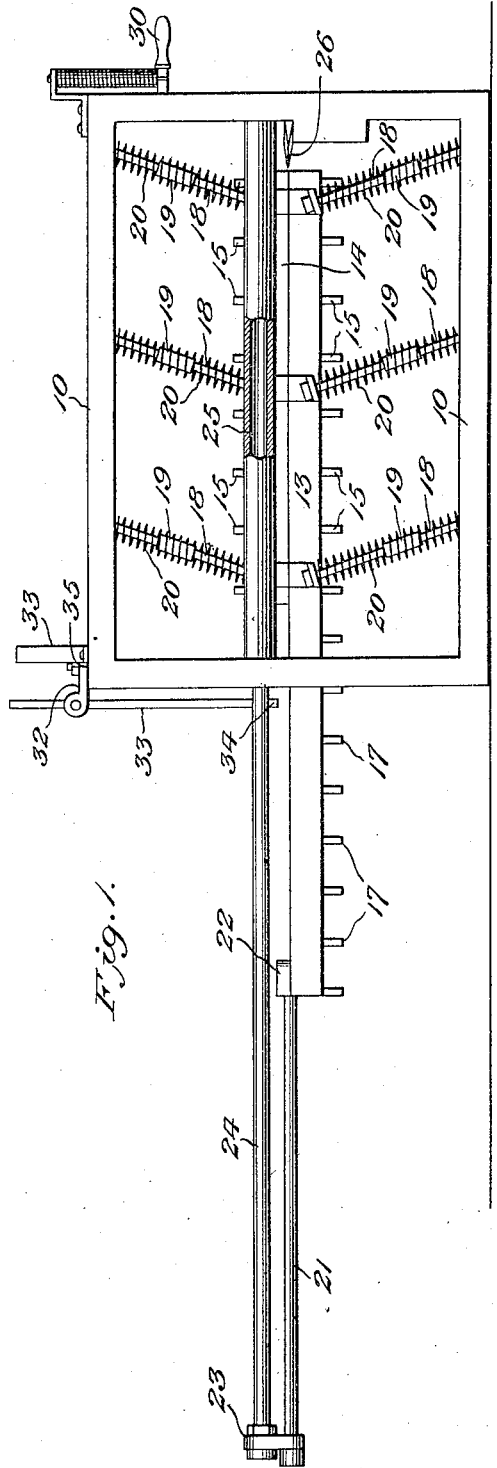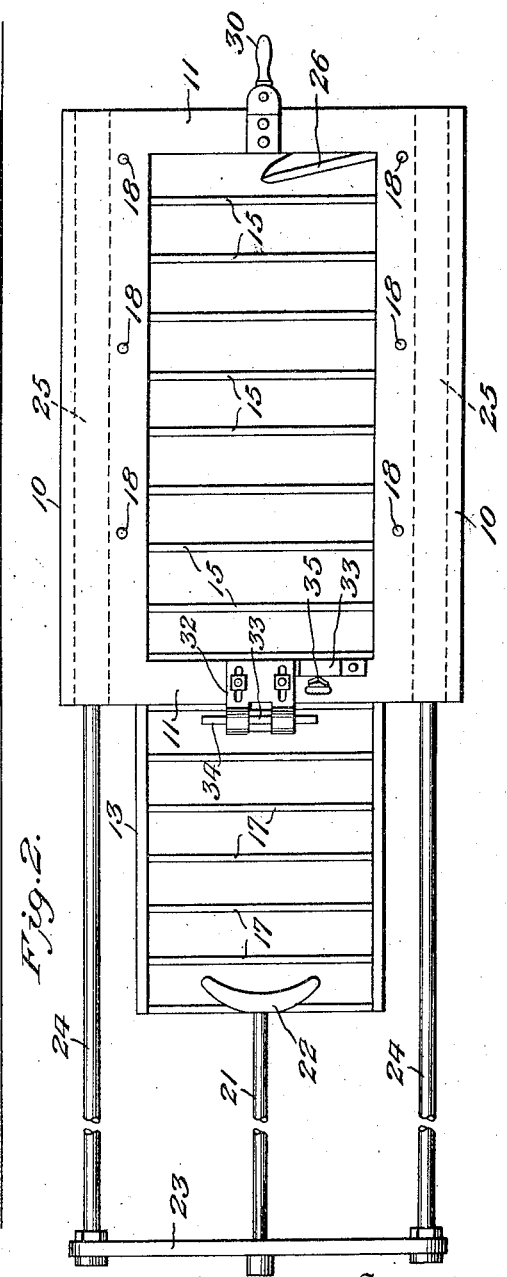

UNITED STATES PATENT OFFICE.

IONA GRAYSON, OF TULSA, OKLAHOMA.

FISH-SCALER.

1,328,148.　　　　　Specification of Letters Patent.　　Patented Jan. 13, 1920.

Application filed March 31, 1919. Serial No. 286,304.

*To all whom it may concern:*

Be it known that I, IONA GRAYSON, a citizen of the United States, residing at Tulsa, in the county of Tulsa and State of Oklahoma, have invented new and useful Improvements in Fish-Scalers, of which the following is a specification.

This invention relates to devices for scaling fish, the object being to provide a simple and inexpensive device of this character, which, in addition to removing the scales, will cut off the head and fins of the fish.

Another object of the invention is to provide a fish scaler which includes opposed scale bars and means whereby the fish may be pushed along between the bars for contact with teeth carried thereby, which latter remove the scales, while a knife positioned between the bars and located in the path of the fish, slits the latter.

Another object is to provide a knife, which is positioned at the end of the scaling bars and transversely of the path of movement of the fish, which may be operated to cut the head from the fish, while a device mounted on the scaler serves to remove the fins.

Other objects and advantages of the invention will appear as the following description is read in connection with the accompanying drawings.

In the drawings:

Figure 1 is a side elevation of a fish scaler embodying the present invention.

Fig. 2 is a plan view of the same.

Fig. 3 is a central longitudinal sectional view.

Fig. 4 is a transverse sectional view taken approximately midway the length of the scaler, and Fig. 5 is a similar view taken on a line with the knife for removing the head.

Referring in detail to the drawings, wherein like characters of reference denote corresponding parts, the scaler comprises a substantially rectangular frame which is composed of longitudinal bars 10 and transverse bars 11, the latter serving to connect the longitudinal bars.

Located within the main frame is a pair of scaling frames 13 and 14, the said frames being positioned substantially central of the main frame and longitudinal thereof. The scaling frames include longitudinal bars, which are connected by curved transverse bars 15, the latter being curved outwardly and suitably spaced apart. The bars 15 are provided with inwardly extending teeth 16, which are adapted to contact with and remove the scales from the fish during its passage between the bars, as will be later described. The scaling frame 14 is positioned within the ends of the main frame, while the slide bars of the scaling frame 13 extend beyond the front end of the main frame and are provided with spaced longitudinally curved bars 17, upon which the fish is positioned for entrance between the scaling bars.

The scaling frames 13 and 14 are yieldingly held in position through the medium of rods 18, which are formed in sections and connected together through the medium of threaded couplings 19. One section of each of the rods 18 is surrounded by a coil spring 20, the latter acting to force the scaling frames 13 and 14 together and to urge the said frames toward the front end of the device in opposition to the path of the fish.

Mounted for movement between the bars of the scaling frames 13 and 14, is a pusher rod 21, which carries at one end a yoke or saddle 22, for engagement with the head of the fish and by means of which the latter is pushed through the scaling frames 13 and 14, between the bars 15, for contact with the teeth 16. The pusher rod 21 is mounted within a substantially U shaped frame, which includes a cross bar 23 to which the rod 21 is secured and substantially parallel side arms 24, the latter being movable within tubular guides 25, secured to each side of the main frame of the device.

Located at one end of the scaling frame 14, is a knife 26, which extends inwardly between the scaling bars of the frames 13 and 14 in the path of movement of the fish, the purpose being to slit the fish longitudinally in the usual manner.

Located at one end of the main frame, adjacent the ends of the scaling frames 13 and 14, is a stationary knife 27, which is adapted to coöperate with a movable knife 28. This last mentioned knife is carried by one end of a knife frame 29, the upper end of which is formed into a handle 30, to provide means for moving the knife vertically across the ends of the scaling frames 13 and 14, for the purpose of severing the head from the fish. The knife 28 operates in guides 31, positioned at each side of the frame, which guides act to keep the knife in proper position for coöperation with the stationary knife 27.

Mounted upon one of the connecting bars 11, at the opposite end of the main frame, is an adjustable bracket 32, which forms a pivotal mounting for a lever 33, the latter carrying at one end a cross bar 34, for the purpose of removing the fins from the fish. Mounted adjacent the bracket 32 is a pointed stud 35 and a pivoted arm 36, which coöperates with the lever 33.

The invention is susceptible of various changes in its form, proportions and minor details of construction and the right is herein reserved to make such changes as properly fall within the scope of the appended claims.

The fish is inserted tail first into the machine between the curved bars 15, the teeth of which engage and remove the scales as the fish is pushed through by operating the U shaped frame, with the saddle 22 in contact with the head of the fish. The knife 26 acts to slit the fish longitudinally as the latter passes between the bars 15, while the knives 27 and 28 are used to remove the head after the body of the fish has passed through the machine. During its passage the fins of the fish which project from its sides are engaged with the cross bar 34 on the end of the lever 33 and are broken off.

Having described the invention, what is claimed is:

1. A fish scaler comprising outwardly curved scaling bars, suitably spaced apart, inwardly extending teeth carried thereby, a pusher bar operating between the scaling bars to move the fish in contact with the teeth and means for yieldingly holding the scaling bars in position.

2. A fish scaler comprising outwardly curved scaling bars, suitably spaced apart, inwardly extending teeth carried thereby, a pusher bar operating between the scaling bars to move the fish in contact with the teeth, means for yieldingly holding the scaling bars in position and a knife positioned at the end of the scaling bars and guided transversely thereof for cutting the head from the fish.

3. A fish scaler comprising outwardly curved scaling bars, suitably spaced apart, inwardly extending teeth carried thereby, a pusher bar operating between the scaling bars to move the fish in contact with the teeth, means for yieldingly holding the scaling bars in position and a cutter positioned at the end of the scaling bars, said cutter comprising a stationary blade and a blade movable in guides located at each side of the scaling bars for cutting the head from the fish.

4. A fish scaler comprising outwardly curved scaling bars, suitably spaced apart, inwardly extending teeth carried thereby, a pusher bar operating between the scaling bars to move the fish in contact with the teeth, means for yieldingly holding the scaling bars in position and a knife extending between the scaling bars in the path of the fish, whereby the latter will be cut open during its passage through the scaler.

5. A fish scaler comprising outwardly curved scaling bars, suitably spaced apart, inwardly extending teeth carried thereby, a pusher bar operating between the scaling bars to move the fish in contact with the teeth, means for yieldingly holding the scaling bars in position and a pivoted fin removing element adjacent the scaling bars.

6. A fish scaler comprising a pair of opposed yieldingly mounted frames, oppositely and outwardly curved scaling bars extending transversely of the said frame, inwardly extending teeth carried by the bars, a pusher bar operating between the scaling bars to move the fish through said scaling bars for contact with the teeth and means for guiding the pusher bar in its movement.

7. A fish scaler comprising a pair of opposed yieldingly mounted frames, oppositely and outwardly curved scaling bars extending transversely of each of said frames, inwardly extending teeth carried by the bars, a frame movable transversely of the scaling bars, a pusher bar carried by said frame and operating between the scaling bars to move the fish therethrough for contact with the teeth and means for guiding the pusher bar in its movement.

8. A fish scaler comprising a pair of opposed yieldingly mounted frames, oppositely and outwardly curved scaling bars extending transversely of said frames, inwardly extending teeth carried by the bars, a frame movable transversely of the scaling bars, a pusher bar carried by said frame and operating between the scaling bars to move the fish therethrough for contact with the teeth and means including tubular guide members positioned upon each side of the scaling bars for guiding the pusher bar in its movement.

In testimony whereof I affix my signature.

IONA GRAYSON.